United States Patent [19]

Goldsmith et al.

[11] Patent Number: 5,113,387
[45] Date of Patent: May 12, 1992

[54] THREE LASER OPTICAL DISK DRIVE SYSTEM

[75] Inventors: Paul Goldsmith, Bethesda; William R. A. Ziegler, Germantown, both of Md.

[73] Assignee: Optex Corporation, Rockville, Md.

[21] Appl. No.: 449,002

[22] Filed: Dec. 12, 1989

[51] Int. Cl.$^5$ ............................................. G11B 7/095
[52] U.S. Cl. ................................ 369/44.38; 369/112; 369/121; 369/275.2
[58] Field of Search ............... 369/44.37, 44.38, 44.39, 369/48, 49, 112, 106, 121, 122, 275.2, 108, 100; 365/106, 119, 110–112

[56] References Cited

U.S. PATENT DOCUMENTS

| | | |
|---|---|---|
| 2,521,124 | 9/1950 | Miller . |
| 2,522,074 | 9/1950 | Urbach . |
| 2,527,365 | 10/1950 | Leverenz . |
| 2,742,631 | 4/1956 | Rajchman et al. . |
| 2,979,467 | 4/1961 | Keller . |
| 3,767,588 | 10/1973 | Otomo et al. . |
| 4,064,066 | 12/1977 | Toshinai et al. . |
| 4,113,353 | 9/1978 | Matsushita . |
| 4,170,475 | 10/1979 | Kuehnle et al. . |
| 4,549,083 | 10/1985 | Ozawa . |
| 4,704,635 | 11/1987 | Nudelman . |
| 4,752,922 | 6/1988 | MacAnally ................ 364/44.38 X |
| 4,830,875 | 5/1989 | Lindmayer ................. 250/327.2 X |
| 4,842,960 | 7/1989 | Lindmayer ................. 252/301.4 S |
| 4,864,536 | 9/1989 | Lindmayer ..................... 365/119 X |
| 4,918,682 | 4/1990 | Finegan ........................ 369/112 X |
| 4,959,824 | 9/1990 | Ueda ............................. 369/112 X |

FOREIGN PATENT DOCUMENTS

WO85/04892 11/1985 PCT Int'l Appl. .

OTHER PUBLICATIONS

S. P. Keller et al., "Studies on Some Infrared Stimulable Phosphors", *Physical Review*, vol. 108, No. 3, Nov. 1, 1957.

Lindmayer, "Infrared Phosphors as Sensors", *Sensors*, Mar. 1986.

Mims, II, "How to See Near-Infrared Radiation", *Modern Electronics*, May 1986.

Foreman, Jr., et al., "Optical Memory Characteristics of a SrS(Eu, Sm) Phosphor", *Proceedings of the IEEE*, pp. 425–426, Mar. 1966.

Duggan, Jr., et al., "Optical Dynamic Disk Storage Device", *IBM Technical Disclosure Bulletin*, vol. 21, No. 5, Oct. 1980.

"Phosphor Disk Bit Storage", *Transactions of the IECE of Japan*, vol. E59, No. 10, Oct. 1976.

Lindmayer, "A New Erasable Optical Memory", *Solid State Technology*, Aug. 1988.

Primary Examiner—Roy N. Envall, Jr.
Assistant Examiner—W. R. Young
Attorney, Agent, or Firm—Dickstein, Shapiro & Morin

[57] ABSTRACT

An erasable optical disk drive system is disclosed which utilizes an electron trapping media coated on the disk surface to store data in the form of light energy and which utilizes three laser beams, each having a wavelength range distinct from each other as well as distinct from the wavelength range of the emission produced by the impingement of the read laser onto the electron trapping media. Data is written onto the disk, which is contained in a light-tight contamination-free environment, using a visible light laser beam. Data is read from the disk and the disk is erased by using a near infrared light laser beam. The focus and tracking functions of the disk drive system are accomplished by using a laser beam having yet another range of wavelengths, which are greater than those of the visible light laser beam and those of the photon emission from the electron trapping optical memory media, but less than those of the read/erase laser.

18 Claims, 6 Drawing Sheets

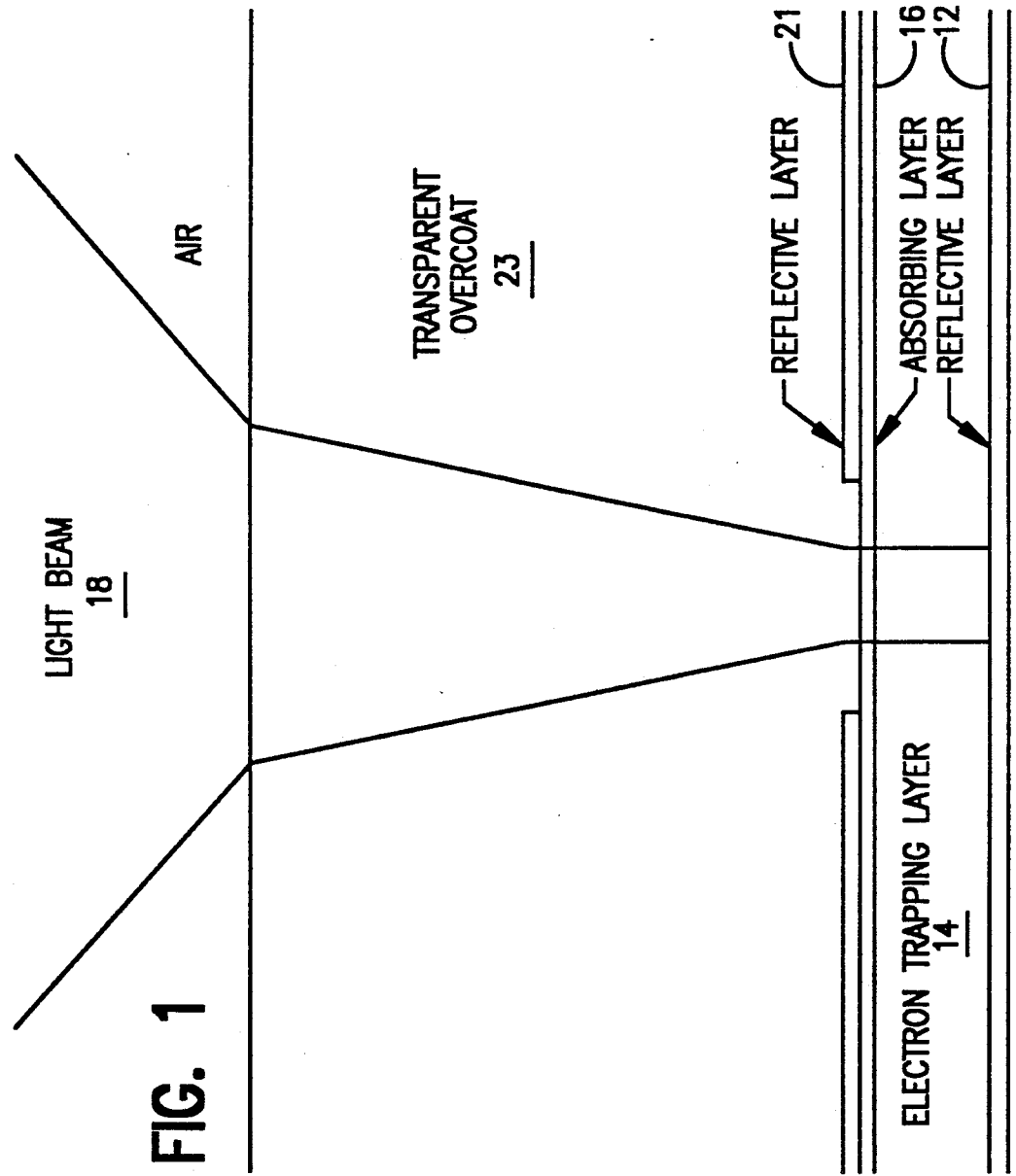

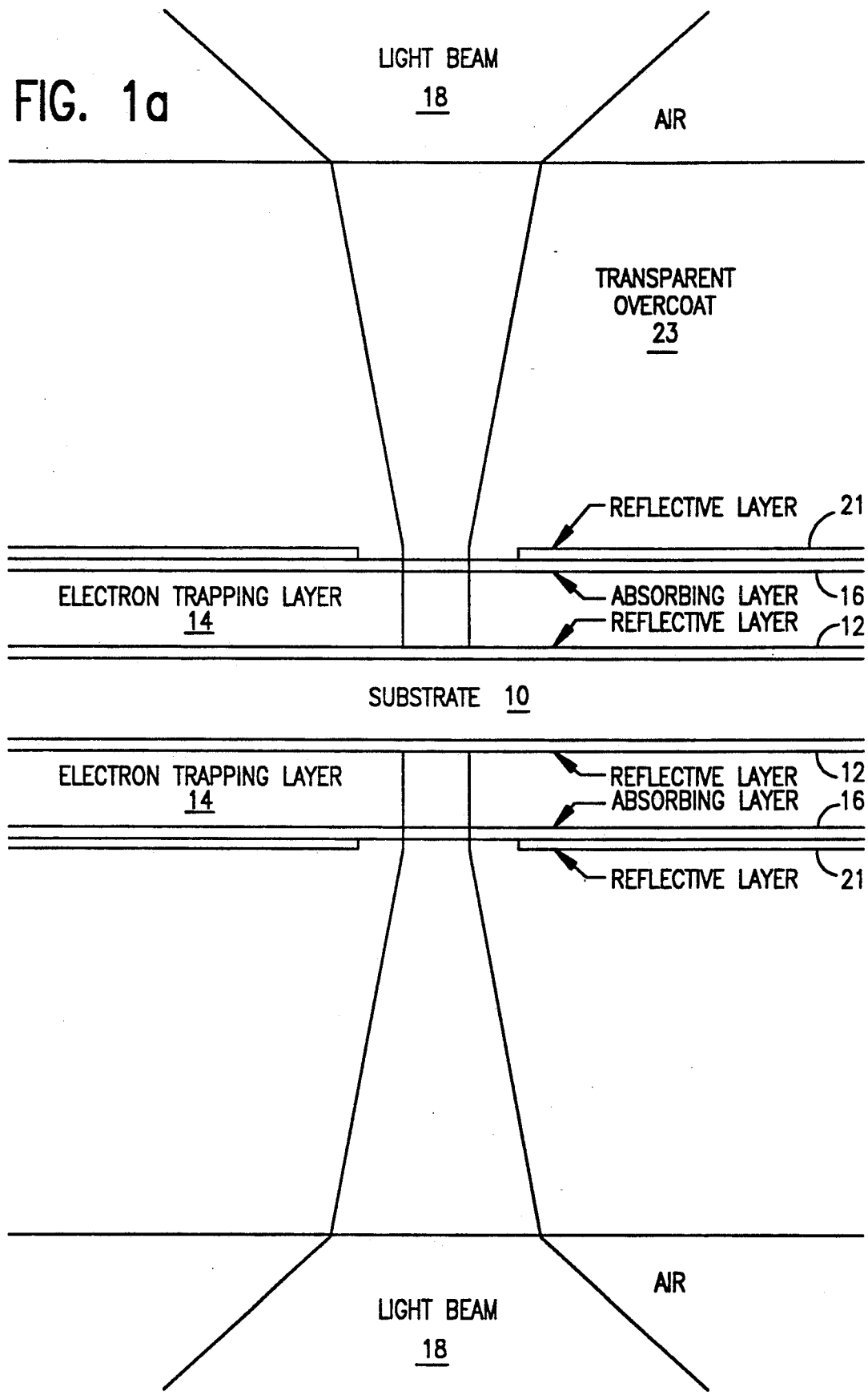

THREE LASER OPTICAL DISK DRIVE SYSTEM

CROSS REFERENCE TO RELATED APPLICATIONS

The assignee herein is a related company to the assignee of U.S. Pat. No. 4,864,536, issued Sep. 5, 1989 and entitled "Optical Memory Method and System", U.S. patent application Ser. No. 07/184,263, filed Apr. 21, 1988, now U.S. Pat. No. 4,915,982, and entitled "Thin Film Photoluminescent Articles and Method of Making Same", U.S. Pat. No. 5,007,037, issued Apr. 9, 1991 and entitled "Optical Disk Drive System", and U.S. patent application Ser. No. 07/277,255, filed Nov. 29, 1988 and entitled "Three Dimensional Optical Memory". Reference is also made to commonly assigned U.S. patent application Ser. No. 07/449,005 entitled "Optical Disk Structures For Electron Trapping Optical Memory Media", filed concurrently herewith. Each of those disclosures is incorporated by reference herein.

The present invention relates to optical mass storage devices for data storage. More particularly, the present invention relates to a method of and apparatus for mass data or information storage utilizing purely photoelectric processes for writing, reading and erasing stored data and for focusing and tracking functions, in which three lasers, each having a peak at a different wavelength, are utilized to accomplish discrete subsets of those functions.

Optical storage devices for use in storing computer and other data are presently known in the art. Such devices are desirable because of their ability to store vastly more information per disk than known magnetic disk storage devices. While most of the known optical disk drive devices perform read-only functions, there are presently known write-once-read-many times (WORM) and erasable optical memory systems. Heretofore, erasable optical memory systems have encountered much greater developmental difficulty than the read-only or WORM systems, due in part to the increased technical complexity and nature of the characteristics of the disk media itself.

While WORM devices allow the user to encode data of his choice, once encoded, no changes can be made to the data stored on the disk, although the stored data can be read back many times. All of the heretofore known (with the exception of the instant assignee) erasable optical storage device technologies involve techniques that require heat, which usually changes the physical or chemical structure of the materials in performing the write or erase function. In addition, such approaches require a certain "dwell" time during which the spot to which data is being written must be heated or otherwise physically transformed, which increases the time necessary to record or erase data on the disk. Also, performance of the media utilized with such approaches can easily be degraded over time due to the high sensitivity of the media to impurities, impurity diffusion, oxidation and other imperfections that propagate into defects which may only show up after multiple switching cycles or after the manufacturing and testing of the devices.

In order to overcome the problems of prior art erasable optical disk drives, a related company to the assignee of the present invention has developed a new approach to the optical storage materials which provide the storage function of the erasable optical disk drive. This development utilizes the phenomenon known as electron trapping in a class of materials which comprise an alkaline earth crystal typically doped with rare earth elements. Thin crystalline forms of such materials may be formed on various substrate structures, such as glass or aluminum, in order to provide the disk storage medium. Since the trapping phenomenon is a purely electronic process, read-write-erase operations can be performed in very short periods of time. In addition, the physical trapping phenomenon appears to offer a practically limitless media life. Thus, for example, the potential disk storage capacity of a single 5¼ inch disk could be extended to several gygabytes.

The materials which may be used as the media for the optical disk storage system described herein are the subject of, for example, U.S. patent application Ser. No. 07/184,263, which is a continuation of U.S. Pat. No. 4,864,536 and U.S. Pat. No. 4,830,875, which issued on May 16, 1989. Other examples of materials useful as the storage media herein are disclosed in U.S. Pat. No. 4,839,092, which issued Jun. 13, 1989, U.S. Pat. No. 4,806,772, which issued Feb. 21, 1989 and U.S. Pat. No. 4,842,960, which issued Jun. 27, 1989. The a related company to assignee herein is the assignee of each of those issued patents. The disclosure of each of those applications/patents is incorporated by reference herein.

Reference is made to each of the foregoing issued United States patents and patent applications, as well as to the applications discussed in the Cross-Reference To Related Applications section for a discussion of the electron trapping and electron trapping optical memory media phenomena.

Rotating disk memory systems based upon magnetic storage phenomenon require the use of certain control signals for tracking and alignment. Optical rotating disk memory systems require additional control signals in order to perform the focusing function. Thus, the tracking and alignment signals provide information to the drive mechanism so that it can move the magnetic or optical head to the location from which the data is to be retrieved or to which the data is to be written. In the case of optical disk drives, such required signals include those used for focusing, speed, track location and mark locations, as well as for performing the read, write and erase functions of the drive.

Unlike the magnetic disk drive devices and all of the other erasable optical disk drive systems other than those developed by a related company to or the assignee herein, the disclosed optical disk drive system relies upon a thin film of electron trapping material as the media and does not rely upon reflection for readout. Rather, the emission of the media at a first predetermined wavelength under infrared light stimulation is utilized to retrieve prewritten tracking information from the disk. The information written to the disk is written utilizing a laser having a peak at a second known wavelength. The present invention, contrary to the erasable optical disk drive systems previously disclosed, for example, in U.S. Pat. No. 4,864,536 and U.S. patent application Ser. No. 07/225,846, additionally utilizes a third laser having a peak at a third wavelength. As described herein, each of the three lasers have a peak at a distinct and non-interfering or disjunctive wavelength.

With the method and apparatus disclosed in U.S. Pat. No. 4,864,536 and U.S. patent application Ser. No. 07/225,846, data is written onto the disk containing the electron trapping optical memory media utilizing a write laser operating at a wavelength between 450 and 600 nanometers, and preferably at about 450 nanometers. A read laser is utilized to irradiate the disk with near infrared radiation having a preferred wavelength of between 820 and 1400 nanometers, with the maximum response being obtained at about 1,000 nanometers. Format and tracking information is permanently written onto the disk using a high power laser which damages the electron trapping layer in a prescribed pattern. Such prescribed pattern can be read by the write laser since the damaged area will not give off instantaneous emission when struck by the write laser beam. Focusing may be accomplished by turning on the read beam in defined areas of each sector of the disk in order to provide appropriate signals to the focus detection and actuation system.

The system as disclosed by the company related to the assignee has several disadvantages. The primary disadvantage of such a system is the necessity of including digital logic and timing circuits, which are frequently utilized by magnetic hard disk drive systems, to preclude the possibility of erasing data during the focusing operation. Another disadvantage is that such circuits must be included in the disk drive system in order to prevent writing between tracks or writing in data areas during the tracking and track seeking operations.

The present invention overcomes such disadvantages by utilizing three lasers, each with one or more distinct functions. The write laser is used to only write data onto the optical disk. The read laser is used to read data from and erase data on the optical disk. Thus, when it is not reading or erasing data, the read laser is not turned on.

The third laser serves to accomplish the focusing and tracking functions. It operates over a range of 650 to 780 nanometers, which is in between the ranges of both the write and read lasers. The use of this third laser eliminates the possibility of deleting stored data during the focusing and tracking operations and simplifies the drive logic and timing circuitry required for the disk drive disclosed herein for both write and read laser beam control. Such a system is compatible with both sampled and continuous composite focus/tracking servo mechanisms.

SUMMARY AND OBJECTS OF THE INVENTION

In view of the foregoing, it should be apparent that there exists a need in the art for a method of and apparatus for operating and constructing an erasable optical disk drive system utilizing electron trapping material as the storage media in which the digital logic and timing circuitry necessary for operating the disk drive can be greatly simplified. It is, therefore, a primary object of this invention to provide a method of and apparatus for operating and constructing an erasable disk drive system utilizing an electron trapping media in which three different lasers having three different ranges of output wavelengths are utilized such that the write, read, erase, focusing and tracking functions can be easily accomplished without the use of complex digital logic and timing circuitry.

More particularly, it is an object of this invention to provide an erasable optical disk drive system for information storage which is less costly to manufacture and less complex to operate than previously known erasable optical disk drive systems.

Still more particularly, it is an object of this invention to provide an erasable optical disk drive system which utilizes electron trapping optical memory media and a plurality of lasers, each having a distinct and non-interfering range of wavelength from each other, and each perform a discrete function or functions unique from the others.

Briefly described, these and other objects of the invention are accomplished in accordance with its apparatus aspects by providing a disk containing a coating of thin film of electron trapping media which is rotated in a manner similar to that of magnetic hard disk drives, which are also known as Winchester disk drives. Data is written onto the surface of the disk using a diode laser operating at a first predetermined wavelength range. The diode laser is capable of direct modulation and operates within the charging bandwidth of the electron trapping optical memory material.

A second diode laser operates as a read/erase laser and has an output wavelength in a second range, different from the visible wavelengths of the write laser and in the near infrared wavelengths. The read/erase laser is also capable of direct modulation and is turned on or off as required for readback illumination. When stimulated by the near infrared read radiation, any bits that have been previously written onto the disk will cause a predetermined radiation emission characteristic that peaks, for example, in the orange light band. The detection of such emission corresponds to a binary 1 recorded at that point. Conversely, the absence of such radiation emission characteristic at that point corresponds to a binary 0. When operated during an erase cycle, the read/erase laser is modulated to a higher power for individual erasure of written bits.

A third diode laser, operating at a range of wavelengths between the visible light of the first diode or write laser and the near infrared light of the second or read/erase laser, is used for focusing and tracking on the electron trapping optical memory material disk. More particularly, the wavelength range of this third or focusing and tracking laser is greater than the visible write laser wavelength range and is shorter than the read/erase laser wavelength range. In this manner, continuous focusing techniques can be used with no detrimental effects to the stored data.

The optical disk drive system of the present invention also utilizes processing optics to combine the three laser wavelengths and to isolate the incoherent readback emission from the disk. Focus of the lasers onto the disk is maintained with an astigmatic, voice coil actuated, closed-loop servo system. A photo-diode or a photomultiplier tube is used for read data signal pickup. Data input and output is handled by a standard compute interface.

With these and other objects, advantages and features of the invention that may become hereinafter apparent, the nature of the invention may be clearly understood by reference to the following detailed description of the invention, the appended claims and to the several drawings herein.

BRIEF DESCRIPTION OF THE DRAWINGS

FIGS. 1 and 1a are pictorial diagrams of a preferred and an alternate structure of the optical disk which may be used with the present erasable optical disk drive system;

DETAILED DESCRIPTION OF THE PREFERRED EMBODIMENT

Figure 2:
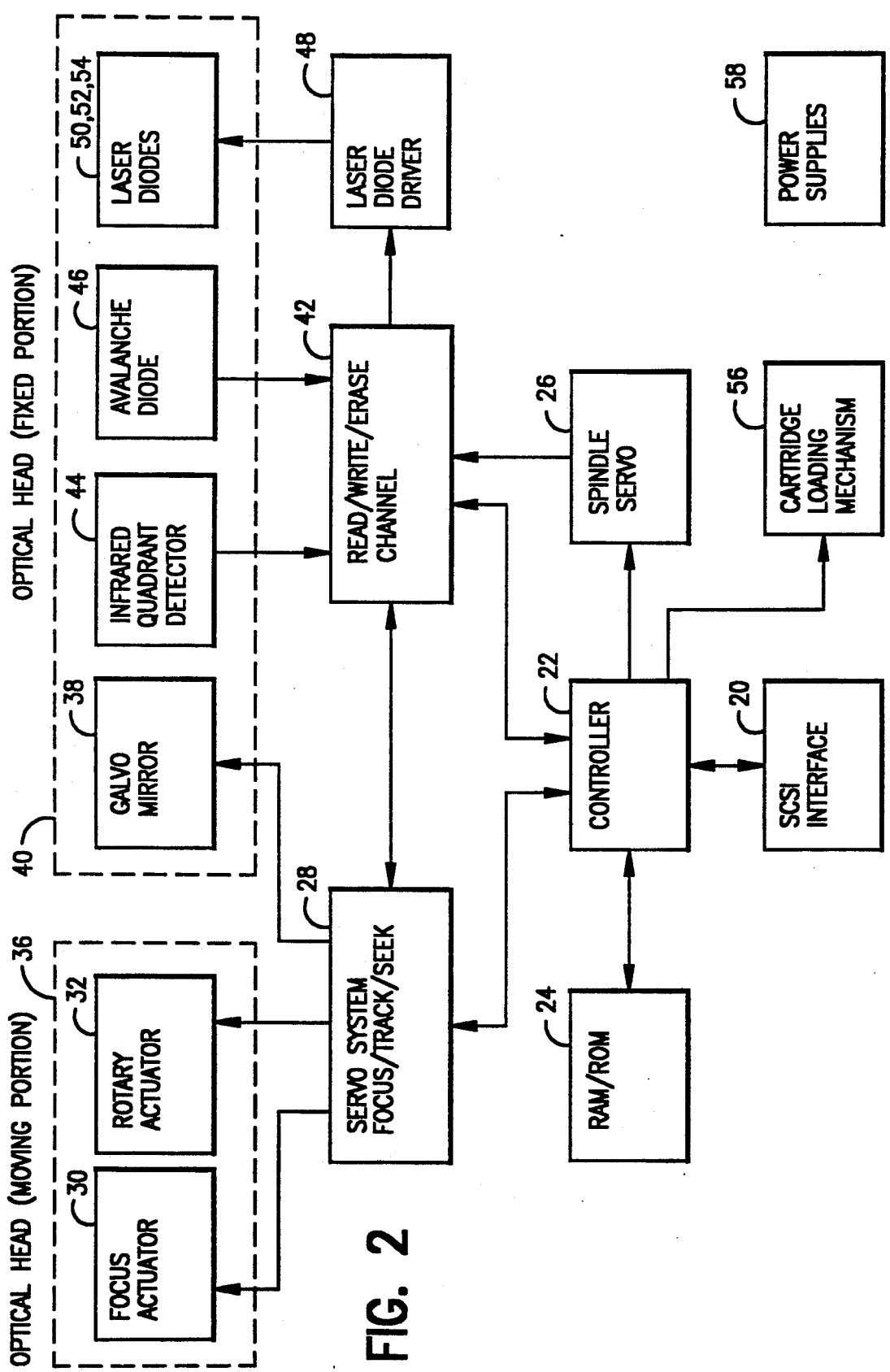
FIG. 2 is a schematic block diagram of the erasable optical disk drive system of the present invention.

Referring now in detail to the drawings wherein like parts are designated by like reference numerals throughout, there is illustrated in FIG. 1 a drawing of a first and preferred disk structure for use with an erasable optical disk drive. The various layers of material are deposited on a substrate structure 10, which may be preferably a ceramic material, such as aluminum oxide. Alternatively, high temperature glasses and other ceramic materials, such as SPINEL (magnesium aluminum silicate) can be used. The substrate may preferably be 1-2 mm in thickness. It should be understood that the layers on the drawings are not drawn to scale with respect to the relative dimensions of the layers or size of the disk.

On top of the substrate, a first reflecting layer 12 is placed, either by vapor or electron beam deposition, sputtering or any other of many similar known processes. This first reflecting layer 12 serves to reflect the visible photon emission created by impingement of a read laser beam on the disk 101 and therefore provides for a greater intensity readback signal. It may be formed from a metal, such as aluminum, and have a thickness of 500 Angstroms.

The electron trapping layer 14 is deposited on top of the first reflecting layer 12 and, as previously discussed, provides the data storage capacity through the electron trapping phenomena. It may preferably be between 1-5 microns in thickness. Deposited on the electron trapping layer is an absorbing layer 16, which functions to absorb reflected and scattered light from both the infrared read and visible write beams, which are both shown as the light beam 18. The absorbing layer may be formed of copper sulfide or other metal sulfides. It may preferably be 500-5000 Angstroms in thickness.

A second light reflective layer 21 is deposited on top of the absorbing layer 16 and provides a specular surface in order to facilitate low power focus and tracking. This second layer 21 may be formed of the same material as the first reflective layer 12. A transparent overcoat 23 is coated on top of the reflective layer 21 and serves to protect the optical layers on the substrate from dust and moisture while at the same time providing a transparent layer through which reading from and writing to the disk can be accomplished. The overcoat layer 23 may be formed of transparent polymer and be about 0.01 to 1 millimeter in thickness. It also provides a dust defocussing function.

Although the disk structure shown in FIG. 1 shows a light beam 18 impinging onto the disk 100 from the top of the disk, the layers 12, 14, 16, 21 and 23 may likewise be deposited on the other side of the substrate 10 in order to form doublesided disk. Such a disk structure is shown in FIG. 1a. It should be noted, however, that each side of the disk 101 can only be written to and read from using a light beam 18 on that respective side of the disk 101. It should be further noted that the disk structure also may be comprised of a transparent substrate between the impinging light beam and the absorbing layer 16, followed by the electron trapping layer 14 and the reflective layer 12. This configuration also may be used to form a double sided disk.

Alternatively, the optical disk structures disclosed in U.S. patent application Ser. No. 07/449,005, filed concurrently herewith and entitled "Optical Disk Structures for Electric Trapping Optical Memory Media" may be utilized in place of the disk structures shown in FIGS. 1 and 1a.

Referring now to FIG. 2, there is shown a schematic block diagram of the major components which make up the erasable optical disk drive system of the present invention, with the exception of the disk 10 itself. As will be apparent to those of ordinary skill in the art, the present erasable optical disk drive system may readily be utilized in place of a Winchester or hard disk drive system as a peripheral for personal or other computers. As such, the computer may communicate with the erasable optical disk drive system through an SCSI interface 20 which is connected to the controller 22 for the erasable optical disk drive system. As is well known in the art, the controller utilizes firm ware stored in either RAM/ROM memory 24 or other memory, in order to control the erasable optical disk drive of the present invention.

Figure 3A:
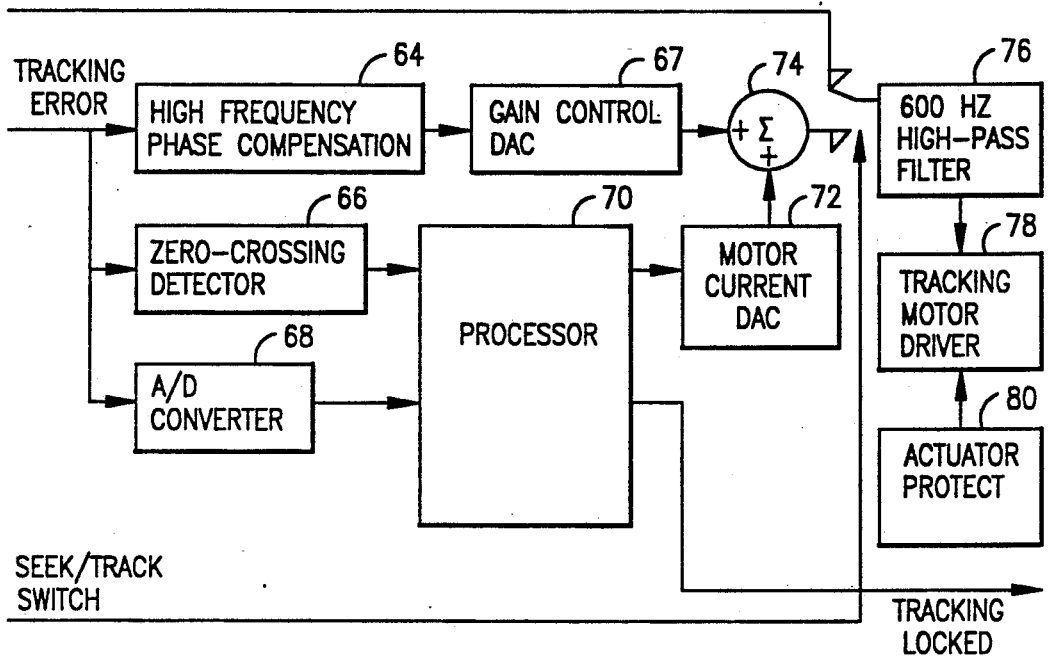
FIG. 3a is schematic block diagram of the tracking portion of the servo system used with the erasable optical disk drive system of the present invention.
Figure 3B:
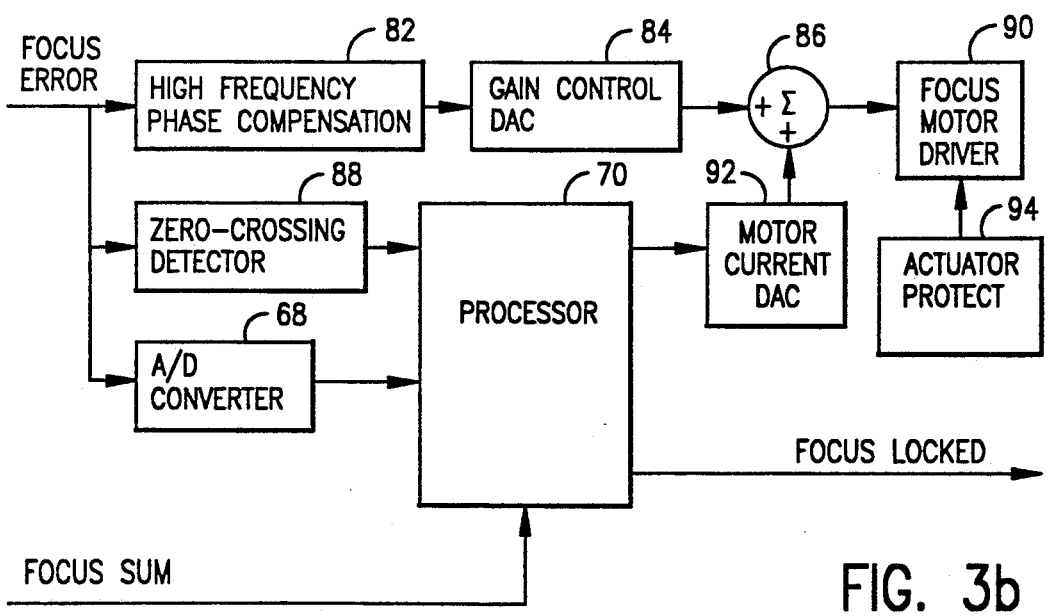
FIG. 3b is a schematic block diagram of the focus portion of the servo system utilized with the erasable optical disk drive system of the present invention.

The controller provides a signal to the spindle servo system 26 such that the disk is rotated at a constant velocity, which may preferably be greater than 4,000 rpm. The controller is also connected to a servo system 28 which performs the focus/ track/seek functions. A schematic block diagram of that servo system 28 is shown in FIGS. 3a and 3b. The servo system 28 is connected to operate both a focus actuator 30 and a rotary actuator 32, which are carried on the moving portion 36 of the optical head. A linear actuator could alternatively be utilized in place of the rotary actuator 32.

The servo system 28 also operates the galvanometer mirror 38 which is mounted on the fixed portion 40 of the optical head. In addition, the servo system 28 both transmits and receives signals from the read/write/erase channel 42 which provides instructions to the servo system 28 for actuating the focus actuator 30, rotary actuator 32 and galvanometer mirror 38, at the appropriate times and for the appropriate period.

The read/write/erase channel 42 also receives inputs from the infrared four quadrant detector 44 and the avalanche diode 46. The infrared four quadrant detector 44 is sensitive to all visible and near infrared wavelengths. However, it is positioned in the optical path in such a manner than only the focus/tracking wavelength signals are incident upon it and not to the read or write laser beams.

The infrared four quadrant detector 44 is used to form the focus, tracking and focus sum signals by means of the appropriate algebraic combination of the four diodes contained within the detector 44. These detector-generated signals are used to perform the focus and tracking operations. The avalanche diode 46 responds to the emission wavelengths of the disk. Its output is amplified in the read/write/erase channel 42 and then sent to the controller 22, as well as the SCSI interface 20.

The read/write/erase channel 42 comprises five major subsystems. The first subsystem is the front end, which includes the optical detector and the processing circuitry necessary to convert the low level signal into signals suitable for signal processing. The second subsystem of the read/write/erase channel 42 is the threshold control circuitry, which develops the analog reference level used for digitizing the read signal and the focus sum signal. Peak detectors are utilized, controlled by gate signals from the read/write control subsystem.

The third subsystem of the read/write/erase channel 42 is the encoder/decoder circuitry which, during write operations, first adds error correction code (ECC) information to the data and then encodes the data into 2,7 RLL code. During read operations, the encoder/decoder circuitry first decodes the 2,7 RLL coded data from the disk. The ECC processor then corrects any errors. Other known coding schemes, in addition to 2,7 RLL, may alternatively be utilized.

The fourth subsystem of the read/write/erase channel 42 is the clock synchronizer circuitry, which generates two clock signals. The write clock is developed by a phase-locked-loop synchronized to the clock bits preformatted onto the disk. The read clock is derived from the write clock. The two clocks are necessary since the write beam lags the read beam on the disk. The phase relationship between those two beams varies across the surface of the disk because the linear velocity of the disk is proportional to track radius and thus varies depending upon the track being read.

The final subsystem of the read/write/erase channel 42 is the read/write control circuitry, which decodes the sector and track information obtained from the disk surface. It also controls timing for many of the signals used in the other subsystems.

Figure 4:
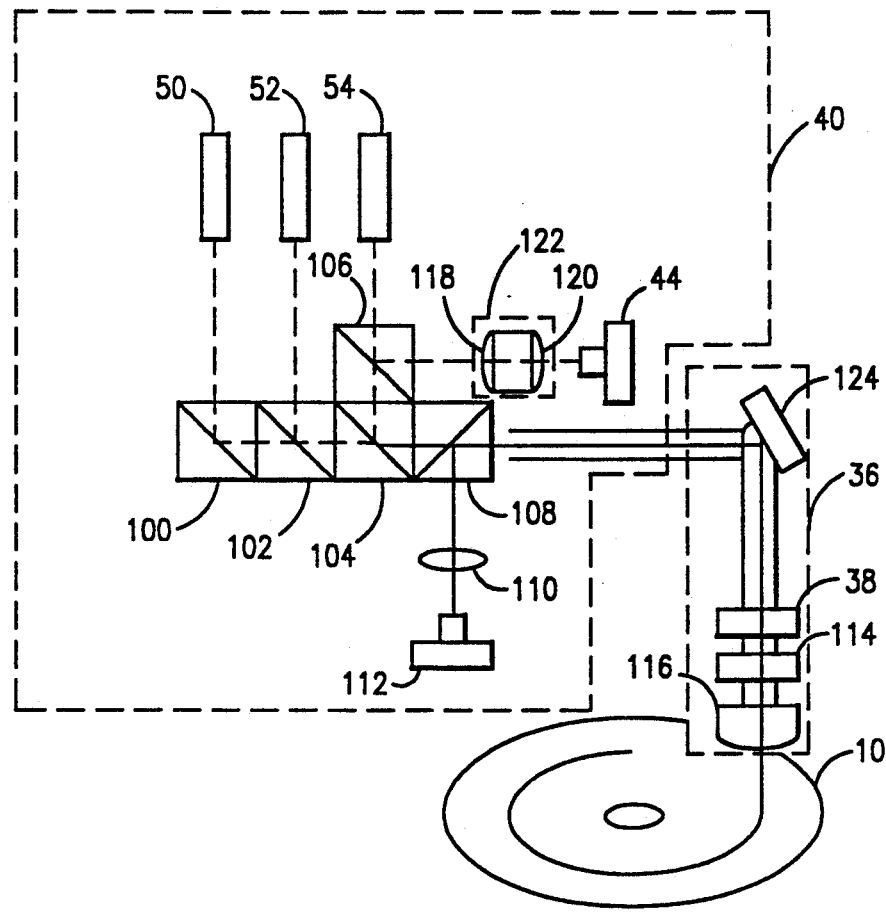
FIG. 4 is a schematic block diagram of the optical processing unit and actuator arm assembly for use with the optical disk drive system of the present invention.

The output from the read/write/erase channel 42 is provided to the laser diode drivers 48 which, upon receiving instructions from the read/write/erase channel 42, actuate the appropriate one of the laser diodes 50, 52, and 54, as will be explained in more detail in connection with FIG. 4.

Since the electron trapping material utilized with the erasable optical disk drive of the present invention cannot be exposed to light other than the three lasers described herein without the loss of its functionality, the disk 10 is preferably contained within a cartridge (not shown) which is loaded by means of cartridge loading mechanism 56, under the control of the controller 22. The optical disk cartridge may preferably be constructed in a known manner similar to that used for removable magneto-optic disks, with the exception that the cartridge must be light-tight. Various power supplies 58 are also provided for powering the erasable optical disk drive system of the present invention, as will be apparent to those of ordinary skill in the art.

As will be described later herein in connection with FIG. 4, the erasable optical disk drive of the present invention utilizes an optical processing system 62 which is shown together with the disk 10 in FIG. 4. It should be noted that the disk 10 is preferably contained within a light-tight cartridge. The disk is then protected from both outside light and contaminating particles. In addition, mounting the disk within a light-tight cartridge provides a major advantage for the optical disk drive of the present invention over known magnetic disk drive systems because the cartridge containing the disk can be readily removed from the optical disk drive and replaced with another cartridge.

Although FIG. 2 has been described in connection with an embodiment of an erasable optical disk drive of the present invention with a single optical disk, such erasable optical disk drive could be configured with an additional head in order to utilize the bottom surface of the disk 10, once it had been appropriately prepared in a manner as described hereinbefore. Or, a disk with two layers of electron trapping optical memory media, one on each side of a "sandwiched disk", may also be utilized. In a like manner, a plurality of heads and disks can be utilized in order to increase the storage capacity of the erasable optical disk drive system of the present invention. The optical disk 10 could also be coated with additional electron trapping layers to increase its storage capacity.

The portion of the servo system used for the moveable portion 36 of the optical head is shown in FIG. 3a. Optical head motion is separated into three types of movement to fulfill three functions: 1) tracking, 2) seeking, and 3) open-loop control. Tracking allows for fine control of the head position to accommodate radial motion of the track underneath the objective during read, write, and erase processes. Seeking allows for coarser control of head movement to change the track that is under the objective. Open-loop control allows for objective motion which does not require a track to be found, eg. parking the head. The seek/track switch signal specifies whether the control of the optical head will be from the tracking control circuitry or from the seeking control circuitry. When the seek/track switch signal specifies tracking control, the circuits of FIG. 3a are allowed to control the head motion. The Carriage Control signal of FIG. 3a is only used when the tracking circuits of FIG. 3a are not selected to control the head motion. That allows seeking and open-loop control of the head motion. As shown in that figure, the tracking error signal received from the tracking amplifier in the read/write/erase channel 42 is simultaneously fed to the inputs of a high frequency phase compensation circuit 64, a zero-crossing detector 66 and an analog-to-digital converter 68. The tracking amplifier receives its inputs from the quad detector 44, as previously discussed.

The outputs from the zero-crossing detector 66 and A/D converter 68 are input to a processor 70, which may preferably be a signal processing circuit, which provides a signal to the motor current digital/analog converter 72, whose output is then fed to a summing circuit 74.

The tracking actuator is configured as a galvanometer mirror 38 which is included in the optical path of the moveable portion 36 of the optical head. It provides fine tracking capability by moving the beam within the aperture of the objective lens 116. The galvanometer driver or tracking motor driver 78 is a commercially available current driver identical to that used for the focus motor driver 90 of FIG. 3b. The first resonant frequency of the galvanometer mirror is less than 40 Hertz. The second and all other resonant frequencies associated with the galvanometer mirror 38 are greater to or equal to 12 kiloHertz. No position sensor is required for the galvanometer mirror since it is part of the fixed portion 40 of the optical head, and therefore does not move when a seek is performed.

The rotary actuator used to move the moving portion 36 of the optical head is driven by means of filtering the compensated tracking error signal from the summer 74 through a 600 hertz high pass filter 76, in order to reduce the residual tracking error below 600 hertz. The low-pass filtered portion of the tracking error compensated signal is used to drive the rotary actuator, while the high-pass filter portion of the tracking error compensated signal is used to drive the galvanometer mirror 38. During a seek, the carriage control signal is fed into the high-pass filter 76, in place of the compensated tracking error signal. This allows the galvanometer mirror 38 to become part of the velocity loop.

Although a perfect disk 10 would exhibit no eccentricity and the tracking loop could thus be closed at any time, a real disk is never ideally centered and thus causes the read beam to cross many tracks as the disk rotates even while focused. Therefore, initial track capture is performed by monitoring the zero-crossing detector 66 output and waiting until the interval between track crossings is longer than the reciprocal of the bandwidth of the loop. At that time, the tracking loop is closed and the processor 70 produces a tracking lock signal. The tracking error signal is continually monitored to verify that track crossings have ceased.

The focus subsystem of the servo system is shown in schematic block diagram form in FIG. 3b. The focus error signal derived from the read/write/erase channel 42 shown in FIG. 2, is proportional to the distance between the plane of the best focus of the reading spot of the read laser 52 and the electron trapping optical memory layer 16 on the disk 10. The focus subsystem uses this signal to position the objective lens so that the focal point is located at its optimum desired position.

The focus subsystem is constructed as a hybrid channel, with the high-frequency portion of the necessary signal processing performed in an analog manner and the low-frequency portion of the signal processing being digitally controlled by the signal processing chip 70. This design allows for adequate processing of the relatively high bandwidths involved (approximately 40 kilohertz) and the number of channels that need to be processed. On the other hand, it will be apparent to those of ordinary skill in the art that the hydrid channel can be implemented as a totally digital channel.

The focus error, focus sum and zero-crossing detector signals generated by the differential summing amplifiers in channel 42 are monitored by the processor 70 in order to facilitate the focusing of the drive. The focus error analog signal goes through a simple lead/lag analog filter or high frequency phase compensation circuit 82, which provides an adequate phase margin at the loop bandwidth. It has a transfer function of the form: $Vo/Vi = (st_z + 1)/(st_p + 1)$, where $1/t_z$ and $1/t_p$ are the zero and pole locations respectively. If the focus actuator 30 has additional phase lag at frequencies close to or at the bandwidth point, this filter can be made more complex by adding additional lead to compensate. In addition, if the actuator 30 has resonant frequencies that interfere with normal closed loop operation, this filter can be designed to notch out those frequencies.

After processing by the high frequency phase compensation or lead/lag filter 82, the focus error signal is fed to a gain control digital-to-analog converter 84 which allows the processor 70 to control the gain of the analog loop. This allows the processor to always maintain the correct loop bandwidth regardless of laser diode power or media reflectively. The processor 70 accomplishes this by monitoring the focus sum signal, which is the sum of the outputs of the four elements of the infrared 4-quadrant detector 44 and is proportional to the amount of signal going through the focus channel. The output from the gain control digital-to-analog-converter 84 is fed to a summer 86.

The focus error signal is also fed to a zero-crossing detector 88 which may be a simple comparator, and allows a reliable, instantaneous indication of the zero-crossing of the focus error signal to be delivered to the processor 70. The use of a zero-crossing detector 88 eliminates any delay caused by sampling the focus error signal and is also useful during the focus capture sequence which will be described hereinafter.

The final component which receives the focus error signal is the analog-to-digital converter 68 which provides a signal to the processor 70 such that the processor is allowed to sample the focus error signal and to thus calculate the low frequency or integrated motor drive signal therefrom. In addition, a feed-forward signal can be developed which can be summed into the focus channel and used to reduce the residual focus error. The output from the signal processor 70 to the motor current digital-to-analog-converter 92 causes the signals to be summed by the motor current digital-to-analog-converter circuit 92 into the analog channel by means of the summer 86.

The A/D converter 68 shown in FIGS. 3a and 3b may be a single A/D converter with multiple input channels. Such A/D converter 68 may also be used to monitor any other analog system parameters, such as focus sum, actuator current, to monitor diode output, laser diode current, etc. and for diagnostic or other purposes.

The output from the summer 86 is fed to the focus motor driver 90 which may be a commercially available high current driver used in a current feedback mode. The current is also monitored by a monolithic true RMS converter circuit. The resulting output from the focus motor driver 90 is compared to a reference value. If the reference value is exceeded, the motor driver is shut down. Additionally, the current driver is also passively prevented from sending the actuator more than its rated maximum instantaneous current by means of the actuator protect circuit 94.

In order for the focus servo system to lock onto the plane of the disk, it is first necessary to move the objective lens 116 somewhere near to the proper distance, at least within the acquisition range determined by the S-curve of the focus error detector. In order to do this, the microprocessor contained in the controller 22 generates a ramp function for the focus current. This moves the objective lens 116 in and out. At the same time, the microprocessor in the controller 22 monitors the focus sum and focus error signal, as well as the output of the zero-crossing detector. When the microprocessor determines that the focus sum signal is sufficient, that the focus error signal has passed through a maximum or minimum, and that the zero-crossing detector has triggered, the microprocessor immediately closes a loop and focus is achieved. At that time, a signal is output on the focus locked line.

The major difference between the operation of the focus subsystem and the tracking subsystem shown in FIG. 3a is that the resulting actuator drive signal is split into two signals, one being a low bandwidth signal for the rotary head positioning actuator, and the other providing a high bandwidth signal for the galvanometer mirror 38. As will be obvious to those of ordinary skill in the art, a linear head positioning mechanism could alternatively be utilized Referring now to FIG. 4, there is shown in schematic diagram form, the optical processing system utilizing three different lasers 50, 52 and 54, for use with the erasable optical disk drive of the present invention. A diode laser functions as a write laser 50 and operates at a wavelength of between 450 and 600 nanometers. It is preferred that a frequency doubled diode laser having its peak at a wavelength of approximately 500 nanometers be utilized for the write laser. The write laser beam is reflected at a 90° angle by a first 450 nanometer reflector 100, passes through three additional reflectors, reflects from the radial arm turning mirror 124 mounted on the radial arm 36, further reflecting from the galvo mirror 38 through a quarter wave plate of approximately 780 nanometers and is focused onto the surface of the disk 10 by a 0.50 or higher numerical aperture objective lens 116 which is carried by the rotary actuator previously discussed. In that manner, data may be written to the disk.

The read and erase functions are performed by a second laser, which may also be a diode laser, and which has an output wavelength of between approximately 820 and 1400 nanometers. It is preferred that the read/erase laser 52 be a diode laser having a wavelength peak at approximately 870 nanometers. The read/erase laser 52 may be directly modulated and is turned on or off as required for readback illumination. During the erase cycle, the laser 52 is modulated to high power for individual bit erasure.

The output from the read/erase laser 52 impinges on a second reflector 102, which may preferably be an 870 nanometer reflector. The output beam from the read laser 52 is reflected at 90°, passes through two additional reflectors 104 and 108, through the quarter wave plate 114 and is focused by means of the objective lens 116 onto the disk.

A third diode laser, operating at wavelengths between 650 and 780 nanometers, is used for focusing and tracking purposes. The focus/tracking laser 54 has a range of wavelengths which falls between the emission band of the electron trapping optical memory material and the near infrared wavelength of the read/erase laser 52. Thus, continuous focusing and tracking techniques can be used with minimum detrimental effects to the stored data.

The output from the third laser 54 passes through a polarized beam splitter 106 of wavelength of preferably 780 nanometers. The beam then impinges upon a third reflector 104, which reflects wavelengths of approximately 780 nanometers, at 90° to the incoming beam. The beam reflected by the third reflector 104 passes through a fourth reflector 108, reflects from the radial arm turning mirror 124 mounted on the radial arm 36, further reflecting from the galvo mirror 38 through the quarter wave plate 114 and is focused onto the disk 10 by means of the objective 116.

The horizontally polarized focus/tracking beam is transmitted through the polarizing beam splitter 106, is reflected off of the 780 nanometer reflector 104 and through the read reflector 108 and the ¼ waveplate 114, which converts the horizontal polarization to circular polarization, and is then focused onto the disk 10 by means of the objective 116. The reflected 780 nanometer wavelength light beam is collected by the objective 116 and then transmitted back through the ¼ waveplate 114 where it is converted to vertically polarized light, through the read reflector 108 and is then reflected off of the 780 nanometer reflector 104.

From the reflector 104, the vertically polarized light is then reflected by the polarizing beam splitter 106, and then through the astigmatic telescope 122. The astigmatic telescope 122 consists of an achromatic doublet element 118 and a cylinder lens 120. That combination of lenses forms the beam into a circle at the focal point of the achromat 118, with the beam forming a line focus orthogonally opposed on either side of the focal point. The quad detector 44 is located at the focal point of the achromat 118.

As the disk wobbles through focus underneath the objective 116, the circular focus is moved to either side of the quad detector 44, causing the line focus to impinge on the quad detector 44. As the two line focii are orthogonally opposed, two diagonally opposed detector elements on one side of focus will be illuminated. On the other side of focus, the opposite pair of diagonally opposed elements will be illuminated. Thus, at focus, all four elements of the quad detector 44 receive equal illumination. It is this difference and the sum of the diagonally opposed elements which form the quad detector 44 which allows the focus servo electronics processor 70, shown in FIG. 3b, to differentiate between focal planes.

Tracking is accomplished by means of the difference of the sum of the two vertically opposed pair of elements while the system is locked in focus. As the focus beam crosses either edge of the reflective band, less light impinges on the pair of detectors of the quad detectors associated with that side of the track, due to the lower reflection of the ETOM material, as compared with the highly reflective tracking band (see FIG. 6). It is this difference in the sum of the vertically opposed pairs of elements which form the quad detector 44 that provides the tracking servo electronics processor 70 with the on/off track information.

The photons released by the impingement of the read laser beam onto the surface of the disk 10 pass through the objective lens 116 and quarter wave plate 114 and onto the fourth reflector 108, which may preferably be a 633 nanometer reflector. The data beam is reflected by the reflector 108 at an angle 90° incident to the incoming beam and is directed through a readback collector lens 110 which may preferably be a 120 millimeter focal length precision optimized achromatic doublet lens. The data beam then impinges on a read detector 112, which produces an electrical signal corresponding to the data read from the disk 10. The read detector 112 may be a photo-multiplier tube. Alternatively, a photo-diode may be utilized, together with the appropriate filters and mirrors, to detect the data beam and convert it into an electrical signal.

Figure 5:
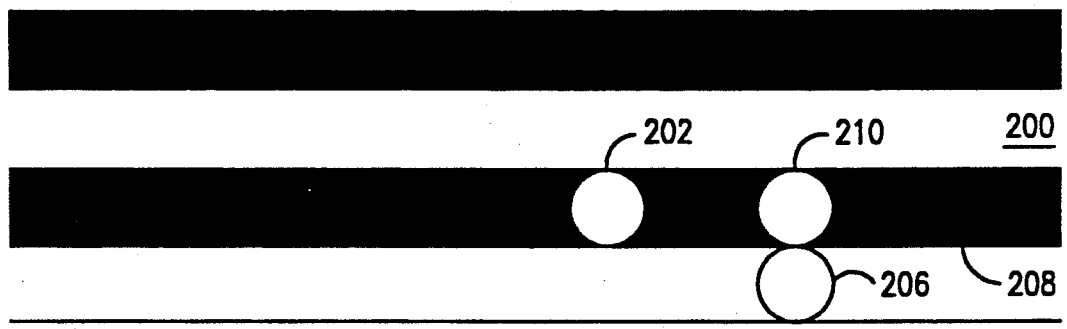
FIGS. 5, and 6 are diagrams illustrating alternative focus/tracking schemes for use with the present invention.

FIG. 5 depicts the beam orientation as it would appear on a disk formatted for a continuous composite tracking scheme. This format consists of alternating concentric reflective bands 200 and data bands 208. The read/erase laser beam 210 has wavelengths which peak at 870 nanometers. The write laser beam 202 has wavelengths with peaks at about 420 nanometers. Both laser beams 202 and 210 are aligned so as to be positioned over the data bands 208. The focus/tracking beam 206 has wavelengths which peak at 780 nanometers and is incident upon the reflective tracking bands 200. The read beam 210 and the write beam 202 are turned off except during their respective operations.

The read/erase beam 210 leads the write beam 202 to provide for erasure before write if required. Since the focus/tracking beam 206 is positioned over a reflective tracking band 200, focus and tracking functions can be performed in a continuous manner with no depletion of written data. During seeking operations, the focus/tracking beam 206 is left on, thus maintaining a focused condition and providing an effective track counting mechanism due to the reflectance change between bands as observed by the quadrant detector in FIG. 7.

Figure 6:
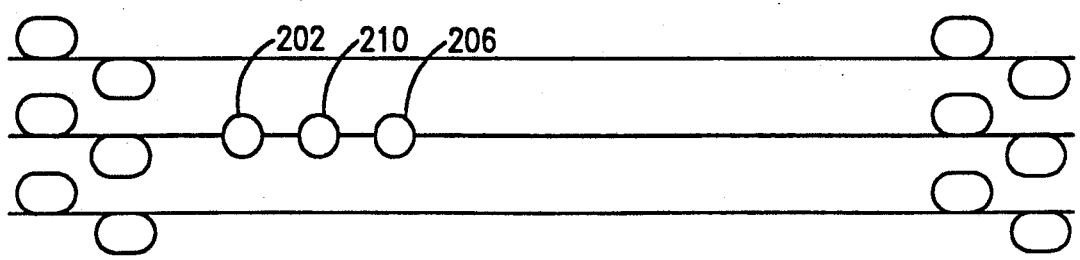

FIG. 6 shows a typical sampled servo tracking configuration. In this format, individual wobble marks are deposited on each side of the track center at periodic intervals. The write and read beams are aligned to the track center and perform the write, read and erase operations at predefined segments of the track. Focusing is performed on the data track center. Due to the nondestructive nature of the focus/tracking beam 206, focusing may be maintained either constantly or periodically, with no depletion of the written data. As the focus/tracking beam 206 passes over the wobble marks, an increase in amplitude from each reflective mark is observed by the quad detector array (FIG. 7).

Figures 7A, 7B, 7C:
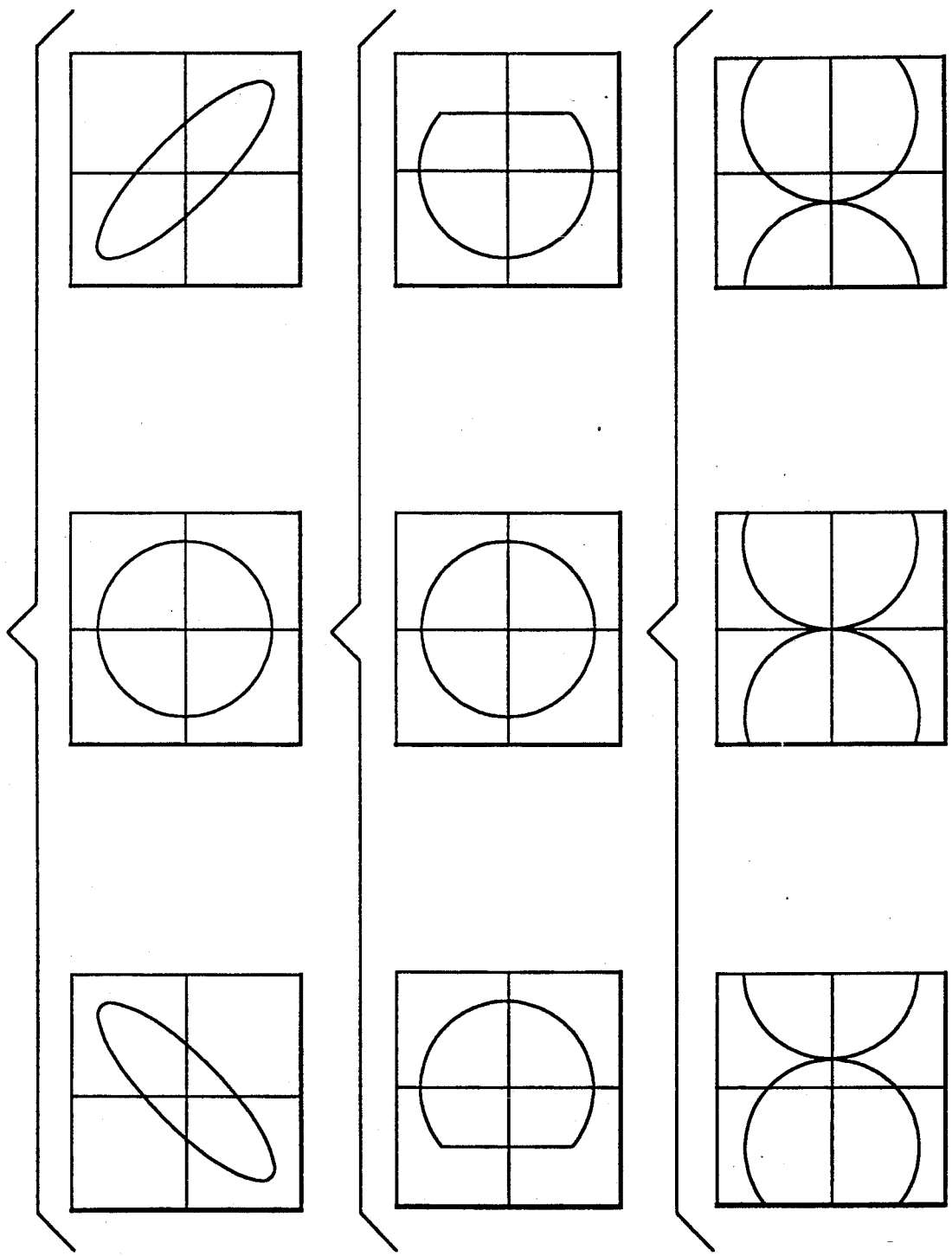
FIG. 7(A-C) is a diagram showing the operation of the quad detector during the focus/tracking schemes depicted in FIGS. 5 and 6.

FIG. 7a shows the at-focus conditions of the astigmatic focus beam impinging on the quad detector. At focus, a circular beam is formed giving equal distribution of impinging light on all four quadrants of the detector 44. An out-of-focus condition results in the astigmatic beam forming an ellipse illuminating two of the diagonally opposed quadrants more so than the other two. That condition is reversed on the opposite side of focus. By observing the difference of the sum of the diagonally opposed quadrants, changes in focus can be noted and corrected.

An example of the tracking function for the continuous composite format on the quad detector array is shown in FIG. 7b. While the beam is on track, there is an equal distribution of illumination on all four quadrants. To either side of the reflective tracking band 200, the reflectivity drops off sharply. As the track wobbles underneath the beam, first one edge of the focus/tracking beam 206 and then the other is clipped. That provides an unequal distribution of illumination between the vertically opposed pairs of quadrants. By observing the difference of the sum of those pairs of quadrants, positional information can be obtained and alignment correction can be made.

An example of tracking for a format sampled servo is shown in FIG. 7c. The focus/tracking beam 206, having the same diameter as the wobble marks, illuminates first, half of one mark and then half of the other mark to determine track position. FIG. 7c shows a composite image of what the detector array sees after both marks have been sampled. On track, both wobbles are equally illuminated, providing for an equal distribution of irradiance on the vertically opposed pairs of quadrants. Off-track, to either side, more of one mark than the other is illuminated, causing one vertically opposed pair of quadrants to have a higher incident energy level. That imbalance in the difference of the sum of the vertically opposed pairs provides directional information to the tracking servo.

Although only a preferred embodiment is specifically illustrated and described herein, it will be appreciated that many modifications and variations of the present invention are possible in light of the above teachings and within the purview of the appended claims without departing from the spirit and the intended scope of the invention.

What is claimed is:

1. An erasable optical disk drive system utilizing a storage media and a plurality of lasers for use in performing the read, write, focus and tracking functions of said erasable optical disk drive system, comprising:
   a. an erasable optical disk utilizing photoluminescent material for the storage media;
   b. a first laser generating a first laser beam having a peak at a first wavelength for reading data from said storage media;
   c. a second laser generating a second laser beam having a peak at a second and different wavelength for writing data to said storage media; and
   d. a third laser generating a third laser beam having a peak at a third and different wavelength for use in performing the focus and tracking functions of said erasable optical disk drive system.

2. The system of claim 1, wherein said photoluminescent material produces a light emission having a peak at a fourth and different wavelength upon impingement of said first laser beam upon data marks written on said storage media and wherein said first wavelength for reading data is greater than said fourth wavelength.

3. The system of claim 2, wherein said second wavelength generated by said second laser is less than said fourth wavelength of said light emission from said photoluminescent material.

4. The system of claim 2, wherein said third wavelength generated by said third laser is between said fourth wavelength of said emission from said photoluminescent material and said first wavelength generated by said first laser.

5. The system of claim 1, wherein said first laser is also used to erase data written on said storage media.

6. The system of claim 1, wherein said third laser beam is nonactinic to said photoluminescent material.

7. A method for operating an eraseable optical disk drive system utilizing a photoluminescent material as the storage media, comprising a plurality of lasers for use in performing the read, write, erase, focus and tacking functions of said erasable optical disk drive system, comprising the steps of:
   a. generating a first laser beam having a peak at a first wavelength for reading data from said storage media;
   b. generating a second laser beam having a peak at a second and different wavelength for writing data to said storage media; and
   c. generating a third laser beam having a peak at a third and different wavelength for use in performing the focus and tracking functions of said eraseable optical disk drive system.

8. The method of claim 7, wherein said photoluminescent material storage media produces a light emission having a peak at a fourth and different wavelength upon impingement of said first laser beam upon data marks written on said storage media and wherein said first wavelength for reading data is greater than said fourth wavelength.

9. The method of claim 8, wherein said second wavelength is less than said fourth wavelength of said light emission from said photoluminescent material.

10. The method of claim 8, wherein said third wavelength is between said fourth wavelength of said emission from said photoluminescent material and said first wavelength.

11. The method of claim 7, wherein said first laser beam is also used to erase data written on said storage media.

12. The method of claim 7, wherein said third wavelength does not affect said photoluminescent material.

13. An erasable disk drive system utilizing a photoluminescent material as the storage media, comprising:
   a. a rotatable erasable optical disk having said photoluminescent material on at least one surface and having a plurality of tracks;
   b. an optical head having fixed and movable portions;
   c. said movable portion of said optical head being movable over the surface of said erasable optical disk and capable of being positioned over one of said plurality of tracks;
   d. a read laser generating a first laser beam having a peak at a first wavelength for reading data form said erasable optical disk;
   e. a write laser generating a second laser beam having a peak at a second wavelength for writing data onto said erasable optical disk; and
   f. a third laser generating a third laser beam having a peak at a third wavelength for performing focus and tracking functions without affecting said photoluminescent material using said erasable optical disk surface.

14. The system of claim 13, wherein said photoluminescent material produces a light emission having a peak at a fourth and different wavelength upon impingement of said first laser beam upon data marks written on said erasable optical disk and wherein said first wavelength for reading data to greater than said fourth wavelength.

15. The system of claim 14 wherein said second wavelength generated by said write laser is less than said fourth wavelength of said light emission from said photoluminescent material.

16. The system of claim 14, wherein said third wavelength generated by said third laser is between said fourth wavelength of said light emission from said photoluminescent material and said first wavelength generated by said read laser.

17. The system of claim 13, wherein said read laser is also used to eras data written on said erasable optical disk.

18. The system of claim 13, wherein said third laser beam is nonactinic to said photoluminescent material.

* * * * *